United States Patent
Wu

(10) Patent No.: US 9,504,052 B2
(45) Date of Patent: Nov. 22, 2016

(54) DEVICE AND METHOD OF HANDLING COMMUNICATION OPERATION WITH MULTIPLE BASE STATIONS

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 15/001,257

(22) Filed: Jan. 20, 2016

(65) Prior Publication Data

US 2016/0212753 A1 Jul. 21, 2016

Related U.S. Application Data

(60) Provisional application No. 62/105,759, filed on Jan. 21, 2015.

(51) Int. Cl.
*H04W 72/08* (2009.01)
*H04W 76/02* (2009.01)
*H04L 5/00* (2006.01)

(52) U.S. Cl.
CPC .......... *H04W 72/085* (2013.01); *H04L 5/0032* (2013.01); *H04W 76/025* (2013.01); *H04W 76/027* (2013.01); *H04W 76/028* (2013.01)

(58) Field of Classification Search
CPC .......... H04W 72/085; H04W 76/025; H04W 76/027; H04W 76/028; H04L 5/0032
See application file for complete search history.

(56) References Cited

U.S. PATENT DOCUMENTS

| 2015/0215965 A1* | 7/2015 | Yamada | H04W 76/046 370/329 |
| 2015/0327107 A1* | 11/2015 | Kim | H04B 7/024 370/252 |
| 2016/0100447 A1* | 4/2016 | Chen | H04W 72/042 370/329 |

FOREIGN PATENT DOCUMENTS

| KR | 1020140120807 A | 10/2014 |
| WO | 2014019131 A1 | 2/2014 |

OTHER PUBLICATIONS

3GPP TS 36.300 V12.4.0 (Dec. 2014) Technical Specification 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12).

(Continued)

*Primary Examiner* — Barry Taylor

(74) *Attorney, Agent, or Firm* — Winston Hsu; Scott Margo

(57) ABSTRACT

A communication device of handling a communication operation with a first base station and a second base station comprises a storage unit for storing instructions and a processing means coupled to the storage unit. The processing means is configured to execute the instructions stored in the storage unit. The instructions comprise performing a communication operation with the second base station via a radio bearer configured as a SCG bearer; detecting a radio link failure on a cell of the second base station or a SCG change failure; suspending the radio bearer and transmitting a SCG failure information message in response to the detection of the radio link failure to the first base station; receiving a radio resource control (RRC) message configuring the radio bearer as a MCG bearer from the first base station; and resuming the second radio bearer in response to the reception of the RRC message.

15 Claims, 5 Drawing Sheets

(56) References Cited

OTHER PUBLICATIONS

3GPP TS 36.331 V12.4.1 (Dec. 2014) Technical Specification 3rd Generation Partnership Project; Technical Specification Group Radio Access Network; Evolved Universal Terrestrial Radio Access (E-UTRA); Radio Resource Control (RRC); Protocol specification (Release 12).

3GPP TS 36.323 V12.2.0 (Dec. 2014) Technical Specification 3rd Generation Partnership Project; Technical Specification Group Radio Access Network; Evolved Universal Terrestrial Radio Access (E-UTRA); Packet Data Convergence Protocol (PDCP) specification (Release 12).

Search Report mailed/issued on Jun. 30, 2016 for EP application No. 16152049.9, pp. 1-8.

* cited by examiner

DEVICE AND METHOD OF HANDLING COMMUNICATION OPERATION WITH MULTIPLE BASE STATIONS

CROSS REFERENCE TO RELATED APPLICATIONS

This application claims the benefit of U.S. Provisional Application No. 62/105,759, filed on Jan. 21, 2015, which is incorporated herein by reference.

BACKGROUND OF THE INVENTION

1. Field of the Invention

The present invention relates to a communication device and a method used in a wireless communication system, and more particularly, to a communication device and a method of handling a communication operation with multiple base stations in a wireless communication system.

2. Description of the Prior Art

A long-term evolution (LTE)-advanced (LTE-A) system, as its name implies, is an evolution of the LTE system. The LTE-A system includes advanced techniques, such as carrier aggregation (CA), dual connectivity, etc.

A UE may receive/transmit packets (e.g., protocol data units (PDUs)) from/to two eNBs, when the UE is configured to connect to the eNBs according to dual connectivity. One of the eNBs is a master eNB (MeNB) of the UE, and the other is a secondary eNB (SeNB) of the UE according to the dual connectivity. A radio link failure (RLF) may occur, when the UE performs a communication operation with the eNBs. According to the prior art, it is not clear how the UE can continue the communication operation with the eNBs, when the UE detects the RLF related to a radio bearer configured by the SeNB. The UE and even the eNBs cannot operate regularly, if proper operation(s) is not taken in response to the RLF. Thus, handling of the communication operation after the RLF is detected an important problem to be solved.

SUMMARY OF THE INVENTION

The present invention therefore provides a communication device and method for handling a communication operation with multiple base stations to solve the above-mentioned problem.

A communication device of handling a communication operation with a first base station and a second base station comprises a storage unit for storing instructions and a processing means coupled to the storage unit. The processing means is configured to execute the instructions stored in the storage unit. The instructions comprise receiving a first configuration configuring a first radio bearer as a master cell group (MCG) bearer for communicating with the first base station from the first base station; receiving a second configuration configuring a second radio bearer as a secondary cell group (SCG) bearer for communicating with the second base station from the first base station or the second base station; performing a communication operation with the second base station via the second radio bearer, after receiving the second configuration; detecting a radio link failure on a cell of the second base station or a SCG change failure; suspending the second radio bearer and transmitting a SCG failure information message in response to the detection of the radio link failure to the first base station; receiving a radio resource control (RRC) message configuring the second radio bearer as the MCG bearer from the first base station; and resuming the second radio bearer in response to the reception of the RRC message.

A method of handling a communication operation for a first base station and a second base station comprises transmitting a first configuration configuring a first radio bearer as a master cell group (MCG) bearer for communicating with the first base station to a communication device by the first base station; transmitting a second configuration configuring a second radio bearer as a secondary cell group (SCG) bearer or a split bearer for communicating with the second base station to the communication device by the first base station or the second base station; performing a communication operation with the communication device via the second radio bearer by the second base station; and receiving a SCG failure information message from the communication device by the first base station, wherein the SCG failure information message comprises at least one of at least one measurement result of at least one serving frequency of the second base station and at least one measurement result of at least one neighboring frequency of a third base station. Then, at least one of following steps is performed: transmitting a first radio resource control (RRC) message configuring the second radio bearer as a MCG bearer to the communication device by the first base station, if the SCG failure information message does not comprise the at least one measurement result of the at least one neighboring frequency or the at least one measurement result of the at least one serving frequency indicates that signal strength or quality of any cell on the least one serving frequency is not greater than a predetermined threshold; transmitting a second RRC message configuring a primary secondary cell (PSCell) of the second base station to a cell of the second base station to the communication device by the first base station, if the at least one measurement result of the at least one serving frequency indicates that signal strength or quality of the cell on one of the at least one serving frequency is greater than the predetermined threshold; and transmitting a third RRC message configuring the communication device to communicate with a third base station operating one of the at least one neighboring frequency to the communication device by the first base station, if the SCG failure information message comprises the at least one measurement result of the at least one neighboring frequency which indicates that signal strength or quality of the one of the at least one neighboring frequency is greater than the predetermined threshold.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
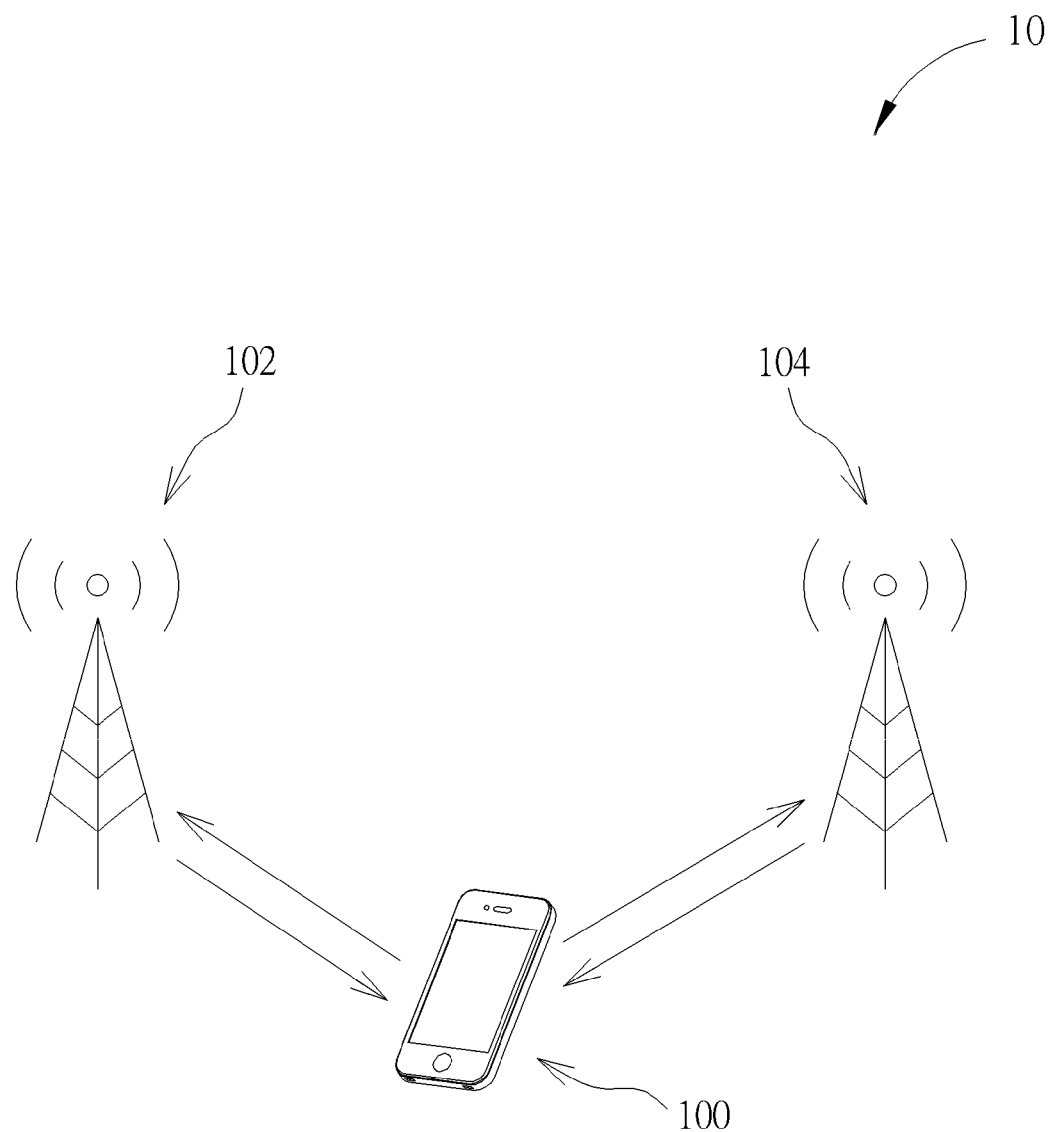
FIG. 1 is a schematic diagram of a wireless communication system according to an example of the present invention.

FIG. 1 is a schematic diagram of a wireless communication system 10 according to an example of the present invention. The wireless communication system 10 is briefly composed of a communication device 100, base stations (BSs) 102 and 104. In FIG. 1, the communication device 100, the BSs 102 and 104 and are simply utilized for illustrating the structure of the wireless communication system 10. Practically, the BS 102 and/or the BS 104 may be evolved NB(s) (eNB(s)) and/or relay(s) station in an evolved UTRAN (E-UTRAN), a long term evolution (LTE) system, a LTE-Advanced (LTE-A) system or an evolution of the LTE-A system. In FIG. 1, coverage areas of the BS 102 and the BS 104 may be overlapped.

As shown in FIG. 1, the communication device 100 may be configured to communicate with the BS 102 and the BS 104 at the same time according to dual connectivity. That is, the communication device 100 may perform a transmission/reception via both the BSs 102 and 104. For example, the communication device 100 may transmit and/or receive packets (e.g., protocol data units (PDUs)) to and/or from the BS 102 via at least one cell of the BS 102, while the communication device 100 may transmit and/or receive packets (e.g., PDUs) to and/or from the BS 104 via at least one cell of the BS 104 according to the dual connectivity. In addition, one of the BSs 102 and 104 may be a master eNB (MeNB) and the other BS may be a secondary eNB (SeNB) according to the dual connectivity defined in 3rd Generation Partnership Project (3GPP). One of the cell(s) of the MeNB may be a primary cell (PCell) for the communication device 100 and the other cell(s) (if available) of the MeNB maybe secondary cell(s) (SCell(s)) for the communication device 100. One of the cell(s) of the SeNB may be a primary SCell (PSCell) for the communication device 100, and the other cell(s)(if available) of the SeNB may be SCell(s)for the communication device 100.

Technical terms related to the examples in the present invention are explained as follows to simplify description of successive examples. The dual connectivity may be an operation mode of a communication device in RRC_CONNECTED, which is configured with a master cell group (MCG) and a secondary cell group (SCG) to the UE. A MeNB may be an eNB which terminates at least Sl-MME. A SeNB may be an eNB which provides additional radio resources but is not a MeNB. A MCG may be one or more serving cells associated with a MeNB, which may include a PCell and optionally one or more SCells. A SCG may be one or more serving cells associated with a SeNB, which may include a PSCell and optionally one or more SCells. A MCG bearer may be a radio bearer whose radio protocols are only located in a MeNB to use MeNB resources only. A SCG bearer may be a radio bearer whose radio protocols are only located in a SeNB to use SeNB resources. A split bearer may be a bearer whose radio protocols are located in both the MeNB and the SeNB to use both MeNB and SeNB resources.

The communication device 100 may be a user equipment (UE), a mobile phone, a laptop, a tablet computer, an electronic book, a portable computer system, a vehicle, or an airplane. For uplink, the communication device 100 is the transmitter and the BS 102 and/or the BS 104 is the receiver, and for downlink, the BS 102 and/or the BS 104 is the transmitter and the communication device 100 is the receiver.

Figure 2:
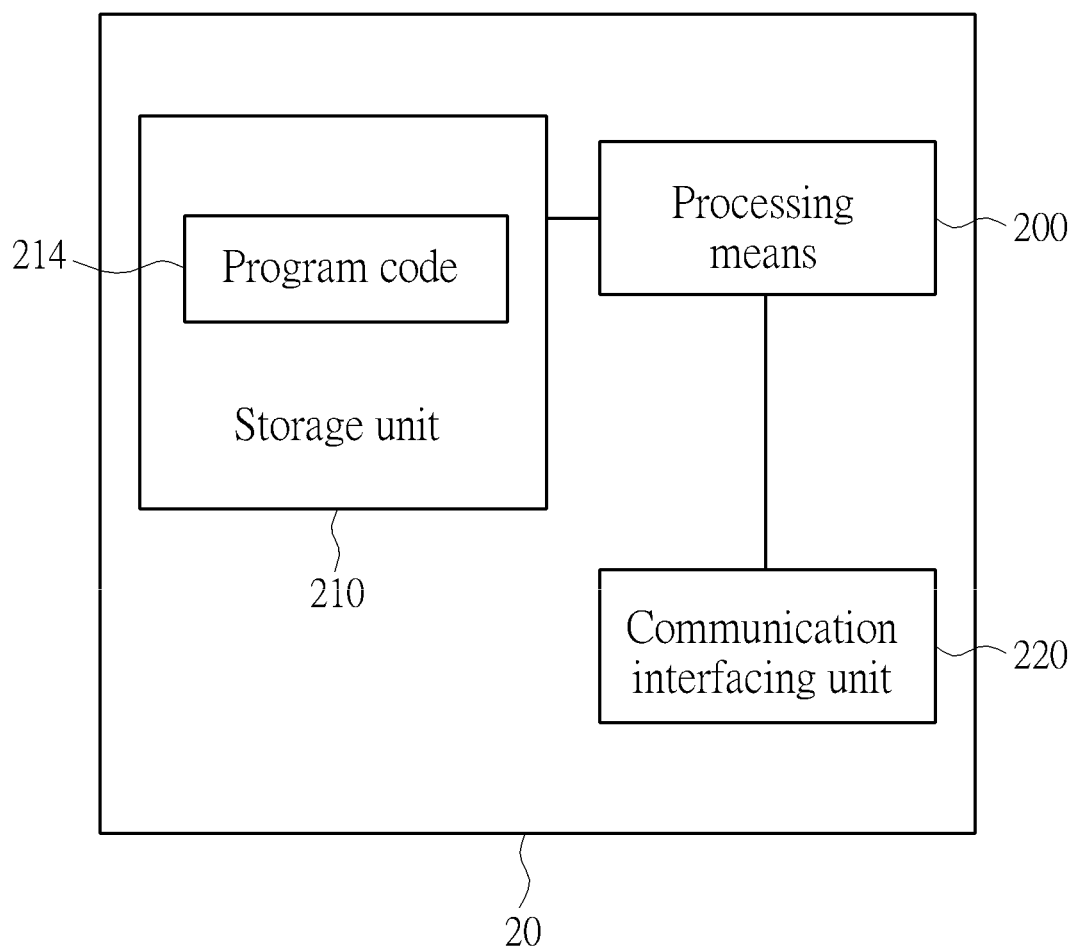
FIG. 2 is a schematic diagram of a communication device according to an example of the present invention.

FIG. 2 is a schematic diagram of a communication device 20 according to an example of the present invention. The communication device 20 may be the communication device 100, the BS 102 and/or the BS 104 shown in FIG. 1, but is not limited herein. The communication device 20 includes a processing means 200 such as a microprocessor or Application Specific Integrated Circuit, a storage unit 210 and a communication interfacing unit 220. The storage unit 210 may be any data storage device that stores a program code 214, accessed and executed by the processing means 200. Examples of the storage unit 210 include but are not limited to read-only memory, flash memory, random-access memory, hard disk, optical data storage device, non-volatile storage unit, non-transitory computer-readable medium (e.g., tangible media), etc. The communication interfacing unit 220 is preferably a transceiver used to transmit and receive signals (e.g., data, signals, messages and/or packets) according to processing results of the processing means 200. For simplicity, the UE is used to represent the communication device 100 in the following embodiments.

Figure 3:
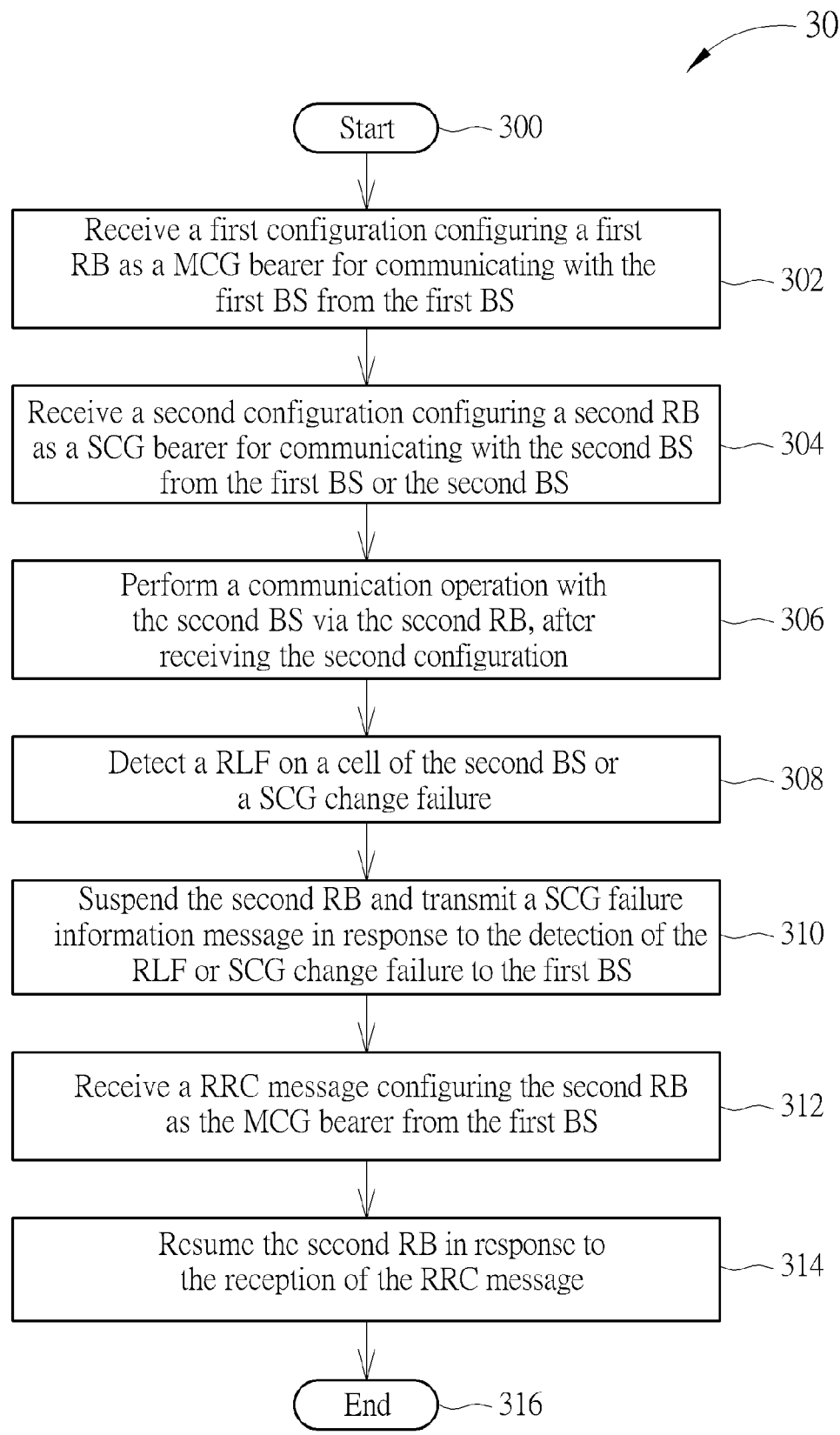
FIG. 3 is a flowchart of a process according to an example of the present invention.

FIG. 3 is a flowchart of a process 30 according to an example of the present invention. The process 30 maybe utilized in a UE (e.g., the communication device 100), to handle a communication operation with multiple BSs (e.g., the BSs 102 and 104). The process 30 may be compiled into the program code 214 and includes the following steps:

Step 300: Start.

Step 302: Receive a first configuration configuring a first radio bearer (RB) as a MCG bearer for communicating with the first BS from the first BS.

Step 304: Receive a second configuration configuring a second RB as a SCG bearer for communicating with the second BS from the first BS or the second BS.

Step 306: Perform a communication operation with the second BS via the second RB, after receiving the second configuration.

Step 308: Detect a radio link failure (RLF) on a cell of the second BS or a SCG change failure.

Step 310: Suspend the second RB and transmit a SCG failure information message in response to the detection of the RLF or SCG change failure to the first BS.

Step 312: Receive a radio resource control (RRC) message configuring the second RB as the MCG bearer from the first BS.

Step 314: Resume the second RB in response to the reception of the RRC message.

Step 316: End.

According to the process 30, the UE may receive a first configuration configuring a first RB as a MCG bearer for communicating with the first BS (e.g., MeNB) from the first BS. The UE may receive a second configuration configuring a second RB as a SCG bearer for communicating with the second BS (e.g., SeNB) from the first or second BS. Then, the UE may perform a communication operation with the second BS via the second RB, in response to the second configuration. The UE may detect a RLF on a cell (e.g. PSCell) of the second BS or detect a SCG change failure, e.g., due to mobility of the UE. Accordingly, the UE suspends the second RB, and transmits a SCG failure information message in response to the detection of the RLF or SCG change failure to the first BS. The UE receives a RRC message configuring the second RB as the MCG bearer from the first BS. Then, the UE resumes the second RB in response to the reception of the RRC message. Thus, the communication between the UE and the second BS can be recovered after the RLF or SCG change failure occurs.

Realization of the process 30 is not limited to the above description.

In one example, the RRC message may or may not configure the UE to change the SCG, i.e., the RRC message may or may not include a MobilityControlInfoSCG information element. In one example, the RRC message may configure the UE to release a SCG configuration which is used by the UE to communicate with the second BS. That is, the UE may not perform the communication operation with the second BS, when the UE releases the SCG configuration in response to the RRC message. Further, the RRC message may reconfigure at least one of a radio link control (RLC) configuration, a packet data convergence protocol (PDCP) configuration and a semi-persistent scheduling (SPS) configuration for the second RB. In one example, the UE may further reestablish a RLC entity of the second RB and/or a PDCP entity of the second RB, when receiving the RRC message.

In one example, the second configuration may include DRB-ToAddModSCG which may include a data RB (DRB) identity identifying the second RB, and the RRC message reconfiguring the second RB from the SCG bearer to the MCG bearer may be a RRCConnectionReconfiguration message comprising drb-ToAddMod which may include the DRB identity of the second RB. In one example, the step of suspending the second RB may include suspending the communication operation with the second BS, and the step of resuming the second RB may include resuming the communication operation with the second BS. In one example, the SCG failure information message may include failure type information indicating the RLF or SCG change failure. In one example, the communication operation may include at least one of a transmission (e.g., of PDUs, sounding reference signal, channel quality indication and/or channel state information) to the second BS and a reception (e.g., of PDUs and/or reference signal) from the second BS.

According to the above description, an example is illustrated as follows. The first BS may transmit a RRC message to the UE, which includes a SCG configuration including at least one of a PDCP configuration and a RLC configuration to configure a DRB with a SCG bearer type. The UE transmits PDCP PDUs to the second BS, and/or receives PDCP PDUs from the second BS via the DRB. The first BS may be a MeNB of the UE, and the second BS may be a SeNB of the UE. After a while, the UE detects a RLF for the SCG or SCG change failure, and the UE suspends the DRB. Hence, the UE suspends the transmission and/or the reception (e.g., of data and/or control information). The UE transmits a SCG failure information message to inform the occurrence of RLF or SCG change failure to the first BS. The first BS may determine to reconfigure the DRB from the SCG bearer type to a MCG bearer type. Accordingly, the first BS transmits a RRCConnectionReconfiguration message to the UE. The RRCConnectionReconfiguration message may include a configuration reconfiguring the DRB to the MCG bearer type. When the UE receives the RRCConnectionReconfiguration message, the UE resumes the DRB such that the UE resumes the transmission and/or the reception. The UE keeps communicating with the first BS when detecting the RLF or SCG change failure so that the UE keeps the transmission and/or reception via another RB (i.e., MCG bearer).

When the UE suspends the DRB, the UE may suspend transmission of PDCP PDUs and/or reception of PDCP PDUs. After the transmission is suspended, the UE does not transmit a physical uplink shared channel (PUSCH) to the second BS according to an uplink grant received on a physical downlink control channel (PDCCH) from the second BS. When the UE receives a downlink assignment on the PDCCH from the second BS, the UE may receive a physical downlink shared channel (PDSCH) from the second BS according to the downlink assignment received on the PDCCH but the UE does not transmit a HARQ feedback on a physical uplink control channel (PUCCH) to the second BS. After the reception is suspended, the UE may not receive the PDCCH, the UE may receive the PDCCH but not receive the PDSCH, or the UE may receive both the PDCCH and the PDSCH but ignore data (e.g., medium access control (MAC) PDU) in the PDSCH.

Figure 4:
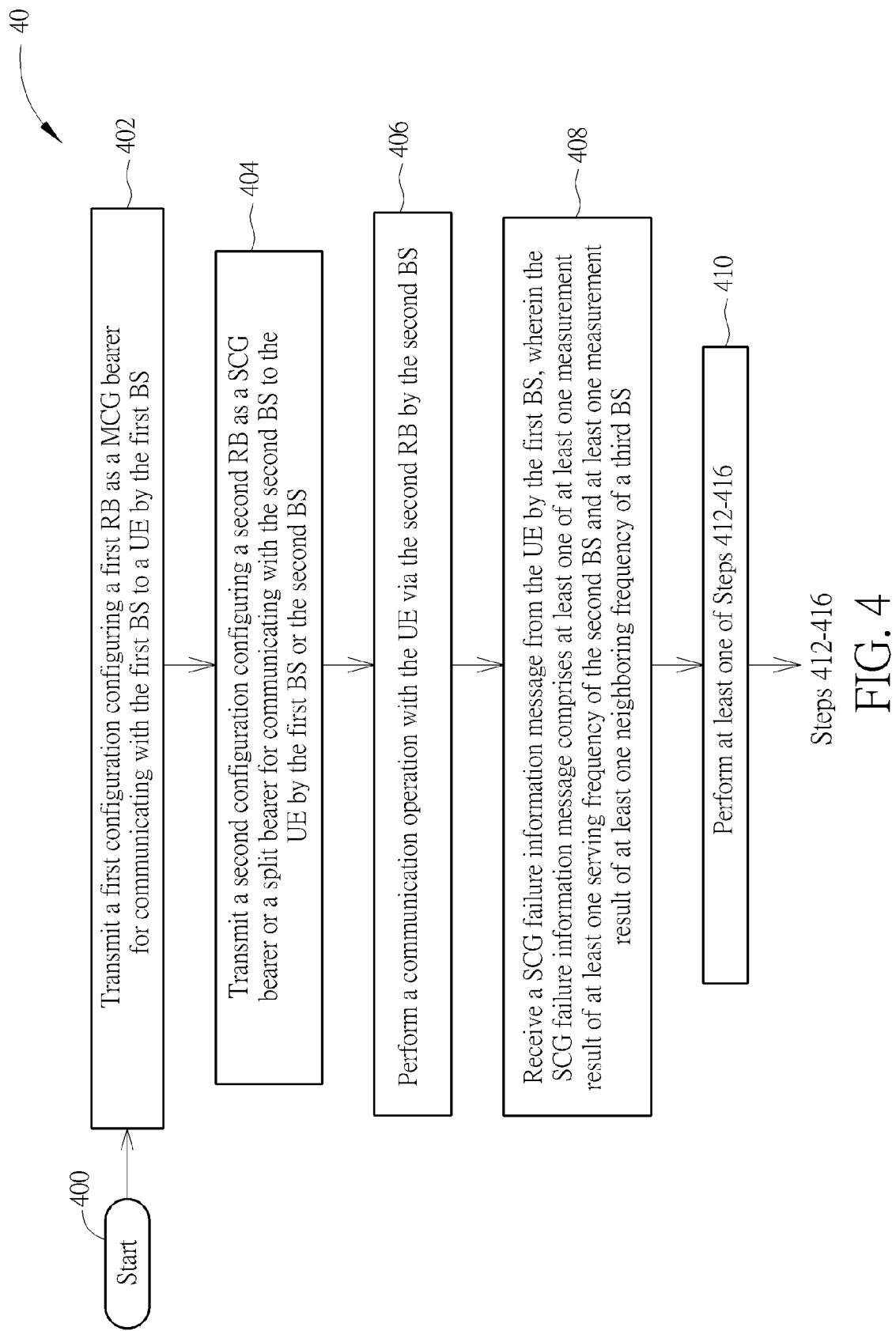
FIGS. 4-5 are a flowchart of a process according to an example of the present invention.
Figure 5:
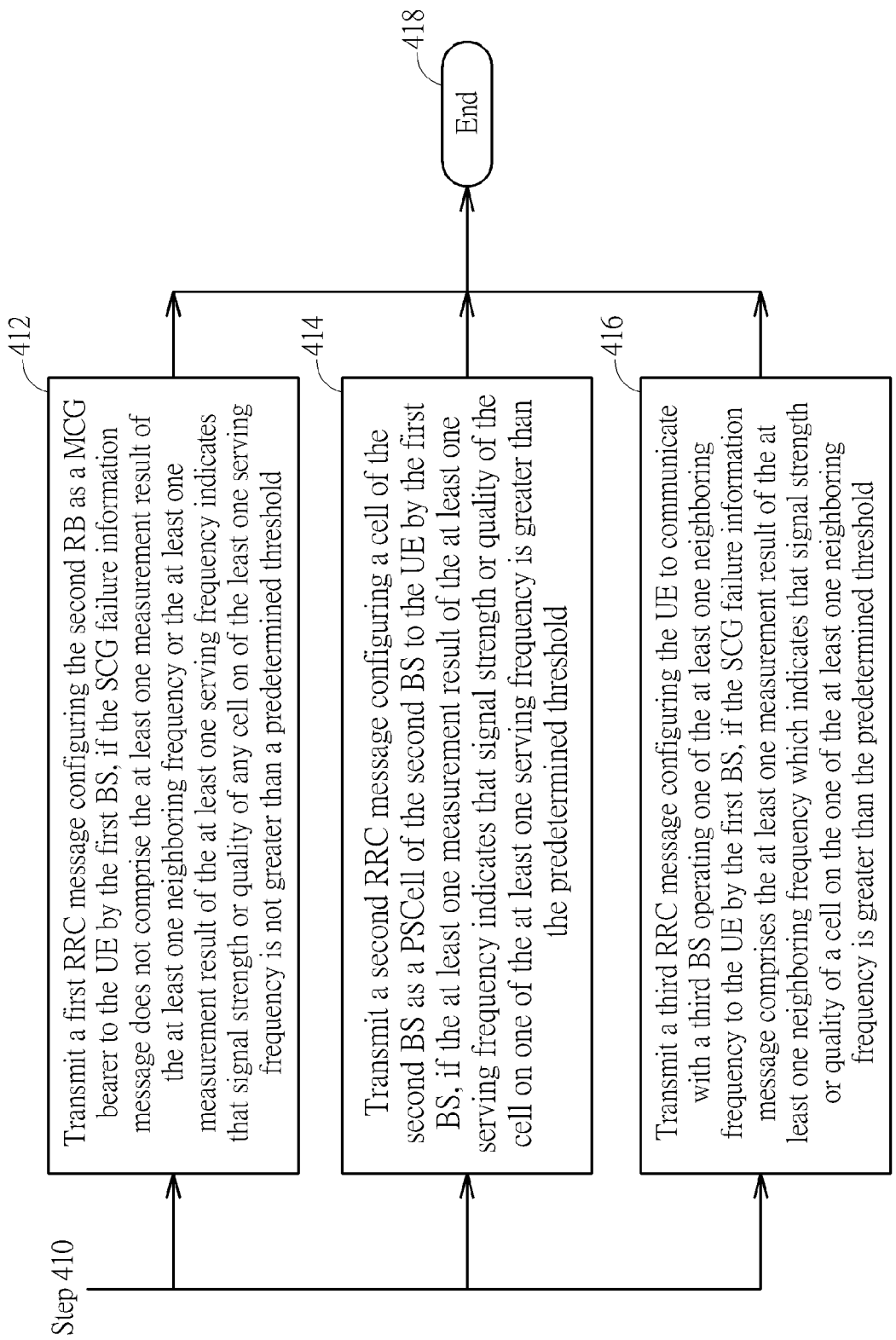

FIGS. 4-5 are a flowchart of a process 40 according to an example of the present invention. The process 40 may be utilized in BSs (e.g., the BSs 102 and 104), to handle a communication operation with a UE (e.g., the communication device 100). The process 40 may be compiled into the program code 214 and includes the following steps:

Step 400: Start.

Step 402: Transmit a first configuration configuring a first RB as a MCG bearer for communicating with the first BS to a UE by the first BS.

Step 404: Transmit a second configuration configuring a second RB as a SCG bearer or a split bearer for communicating with the second BS to the UE by the first BS or the second BS.

Step 406: Perform a communication operation with the UE via the second RB by the second BS.

Step 408: Receive a SCG failure information message from the UE by the first BS, wherein the SCG failure information message comprises at least one of at least one measurement result of at least one serving frequency of the second BS and at least one measurement result of at least one neighboring frequency of a third BS.

Step 410: Perform at least one of Steps 412-416.

Step 412: Transmit a first RRC message configuring the second RB as a MCG bearer to the UE by the first BS, if the SCG failure information message does not comprise the at least one measurement result of the at least one neighboring frequency or the at least one measurement result of the at least one serving frequency indicates that signal strength or quality of any cell on of the least one serving frequency is not greater than a predetermined threshold.

Step 414: Transmit a second RRC message configuring a cell of the second BS as a PSCell of the second BS to the UE by the first BS, if the at least one measurement result of the at least one serving frequency indicates that signal strength or quality of the cell on one of the at least one serving frequency is greater than the predetermined threshold.

Step 416: Transmit a third RRC message configuring the UE to communicate with a third BS operating one of the at least one neighboring frequency to the UE by the first BS, if the SCG failure information message comprises the at least one measurement result of the at least one neighboring frequency which indicates that signal strength or quality of a cell on the one of the at least one neighboring frequency is greater than the predetermined threshold.

Step 418: End.

According to the process 40, the first BS (e.g., MeNB) may transmit a first configuration configuring a first RB as a MCG bearer for communicating with the first BS to a UE. The first BS or the second BS (e.g., SeNB) may transmit a second configuration configuring a second RB as a SCG bearer or a split bearer for communicating with the second BS to the UE. The second BS may perform a communication operation with the UE via the second RB. After a while, the first BS may receive a SCG failure information message from the UE, wherein the SCG failure information message may indicate RLF or SCG change failure and include at least one of at least one measurement result of at least one serving frequency of the second BS and at least one measurement result of at least one neighboring frequency of a third BS.

Then, the first BS may perform at least one of the following operations in response to the SCG failure information message.

The first operation: the first BS may transmit a first RRC message (e.g., RRCConnectionReconfiguration) configuring the second RB as a MCG bearer (e.g., SCG/split to MCG bearer type change) to the UE, if the SCG failure information message does not include the at least one measurement result of the at least one neighboring frequency or the at least one measurement result of the at least one serving frequency indicates that signal strength or quality of any cell of the least one serving frequency is not greater than a predetermined threshold.

The second operation: the first BS may transmit a second RRC message (e.g., RRCConnectionReconfiguration) configuring a PSCell of the second BS to a cell of the second BS to the UE (e.g., PSCell change), if the at least one measurement result of the at least one serving frequency indicates that signal strength or quality of the cell on one of the at least one serving frequency is greater than the predetermined threshold.

The third operation: the first BS may transmit a third RRC message (e.g., RRCConnectionReconfiguration) configuring the UE to communicate with a third BS operating one of the at least one neighboring frequency to the UE (e.g. SCG change from the second BS to the third BS), if the SCG failure information message includes the at least one measurement result of the at least one neighboring frequency which indicates that signal strength or quality of a cell on the one of the at least one neighboring frequency is greater than the predetermined threshold.

Thus, the UE can perform successive operations to recover the communication operation between the UE and the second BS (e.g., according to the process 30).

Realization of the process 40 is not limited to the above description.

In one example, the third RRC message includes a MobilityControlInfoSCG information element and PSCell information indicating the cell. In one example, the first RRC message configures the UE to release a SCG configuration associated to the second BS. The UE releases the SCG configuration in response to the first RRC message. Further, the first RRC message may reconfigure at least one of a RLC configuration, a PDCP configuration and a SPS configuration for the second RB. In one example, the second configuration includes DRB-ToAddModSCG which includes a DRB identity identifying the second RB, and the first RRC message is a RRCConnectionReconfiguration message including drb-ToAddMod which includes the DRB identity of the second RB.

In one example, the second RRC message includes a MobilityControlInfoSCG information element and PSCell information indicating the cell. In one example, the at least one measurement result of the at least one serving frequency includes at least one reference signal received power (RSRP) value and at least one reference signal received quality (RSRQ) value of a cell on the at least one serving frequency, or the at least one measurement result of the at least one neighboring frequency includes at least one RSRP value and at least one RSRQ value of a cell on the at least one neighboring frequency. In one example, the communication operation includes at least one of a transmission (e.g., of PDUs) to the UE and a reception (e.g., of PDUs) from the UE.

In the above examples (e.g., related to the processes 30 and/or 40), the first BS may transmit the first configuration in a RRC message to the UE, e.g., RRCConnectionSetup message or a first RRCConnectionReconfiguration message. The first BS or the second BS may transmit the second configuration in another RRC message to the UE, e.g., a second RRCConnectionReconfiguration message. The second configuration may be included in a SCG configuration in the other RRC message, and the SCG configuration may include cell identity information (e.g., cell global identifier, physical cell identity and/or downlink carrier frequency) for identifying a cell of the second BS.

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20.

To sum up, the present invention provides a communication device and method of handling a communication operation with multiple BSs. The method may be realized in a communication device and/or a BS according various system requirements and/or design considerations. Thus, the interruption of the communication operation caused by a RLF can be solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device of handling a communication operation with a first base station and a second base station, comprising:
   a storage unit, for storing instructions of:
   receiving a first configuration configuring a first radio bearer as a master cell group (MCG) bearer for communicating with the first base station from the first base station;
   receiving a second configuration configuring a second radio bearer as a secondary cell group (SCG) bearer for communicating with the second base station from the first base station or the second base station;
   performing a communication operation with the second base station via the second radio bearer, after receiving the second configuration;
   detecting a radio link failure on a cell of the second base station or a SCG change failure;
   suspending the second radio bearer and transmitting a SCG failure information message in response to the detection of the radio link failure to the first base station;
   receiving a radio resource control (RRC) message configuring the second radio bearer as the MCG bearer from the first base station; and
   resuming the second radio bearer in response to the reception of the RRC message; and
   a processing means, coupled to the storage unit, configured to execute the instructions stored in the storage unit.

2. The communication device of claim 1, wherein the storage unit further stores an instruction of:
   releasing a SCG configuration which is used by the communication device to communicate with the second BS, wherein the RRC message configures the communication device to release the SCG configuration.

3. The communication device of claim 2, wherein the RRC message reconfigures at least one of a radio link control (RLC) configuration, a packet data convergence protocol (PDCP) configuration and a semi-persistent scheduling (SPS) configuration for the second radio bearer.

4. The communication device of claim 1, wherein the storage unit further stores an instruction of:
reestablishing at least one of a RLC entity and a PDCP entity of the second radio bearer, when receiving the RRC message.

5. The communication device of claim 1, wherein the second configuration comprises DRB-ToAddModSCG which comprises a data radio bearer (DRB) identity identifying the second radio bearer, and the RRC message reconfiguring the second radio bearer from the SCG bearer to the MCG bearer is a RRCConnectionReconfiguration message comprising drb-ToAddMod which comprises the DRB identity of the second radio bearer.

6. The communication device of claim 1, wherein the instruction of suspending the second radio bearer comprises suspending the communication operation with the second base station, and the instruction of resuming the second radio bearer comprises resuming the communication operation with the second base station.

7. The communication device of claim 1, wherein the SCG failure information message comprises failure type information indicating the radio link failure or the SCG change failure.

8. The communication device of claim 1, wherein the communication operation comprises at least one of a transmission to the second base station and a reception from the second base station.

9. A method of handling a communication operation for a first base station and a second base station, comprising:
transmitting a first configuration configuring a first radio bearer as a master cell group (MCG) bearer for communicating with the first base station to a communication device by the first base station;
transmitting a second configuration configuring a second radio bearer as a secondary cell group (SCG) bearer or a split bearer for communicating with the second base station to the communication device by the first base station or the second base station;
performing a communication operation with the communication device via the second radio bearer by the second base station;
receiving a SCG failure information message from the communication device by the first base station, wherein the SCG failure information message comprises at least one of at least one measurement result of at least one serving frequency of the second base station and at least one measurement result of at least one neighboring frequency of a third base station; and performing at least one of following steps:
transmitting a first radio resource control (RRC) message configuring the second radio bearer as a MCG bearer to the communication device by the first base station, if the SCG failure information message does not comprise the at least one measurement result of the at least one neighboring frequency or the at least one measurement result of the at least one serving frequency indicates that signal strength or quality of any cell on the least one serving frequency is not greater than a predetermined threshold;
transmitting a second RRC message configuring a primary secondary cell (PSCell) of the second base station to a cell of the second base station to the communication device by the first base station, if the at least one measurement result of the at least one serving frequency indicates that signal strength or quality of the cell on one of the at least one serving frequency is greater than the predetermined threshold; and
transmitting a third RRC message configuring the communication device to communicate with a third base station operating one of the at least one neighboring frequency to the communication device by the first base station, if the SCG failure information message comprises the at least one measurement result of the at least one neighboring frequency which indicates that signal strength or quality of the one of the at least one neighboring frequency is greater than the predetermined threshold.

10. The method of claim 9, wherein the third RRC message comprises a MobilityControlInfoSCG information element and PSCell information indicating the cell.

11. The method of claim 9, wherein the first RRC message configures the communication device to release a SCG configuration associated to the second base station.

12. The method of claim 11, wherein the first RRC message reconfigures at least one of a radio link control (RLC) configuration, a packet data convergence protocol (PDCP) configuration and a semi-persistent scheduling (SPS) configuration for the second radio bearer.

13. The method of claim 9, wherein the second configuration comprises DRB-ToAddModSCG which comprises a data radio bearer (DRB) identity identifying the second radio bearer, and the first RRC message is a RRCConnectionReconfiguration message comprising drb-ToAddMod which comprises the DRB identity of the second radio bearer.

14. The method of claim 9, wherein the second RRC message comprises a MobilityControlInfoSCG information element and PSCell information indicating the cell.

15. The method of claim 9, wherein the communication operation comprises at least one of a transmission to the communication device and a reception from the communication device.

* * * * *